United States Patent
Diekhans et al.

(10) Patent No.: US 6,244,024 B1
(45) Date of Patent: *Jun. 12, 2001

(54) AUTOMATIC STEERING SYSTEM USING AN ULTRASONIC POSITION-FINDING DEVICE

(75) Inventors: Norbert Diekhans; Jochen Huster, both of Gütersloh (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/412,668

(22) Filed: Oct. 5, 1999

(30) Foreign Application Priority Data

Oct. 5, 1998 (DE) .............................. 198 45 666

(51) Int. Cl.⁷ .......................... G06F 17/00; A01D 41/12
(52) U.S. Cl. ............................ 56/10.2 F; 172/4.5
(58) Field of Search .................... 56/10.2 F, 28, 56/30, DIG. 15, 10.2 D; 37/343, 348; 172/2, 4, 4.5, 7; 180/168, 131, 401

(56) References Cited

U.S. PATENT DOCUMENTS

| | | | |
|---|---|---|---|
| 5,694,751 | 12/1997 | Behnke | 56/10.2 F |
| 5,715,665 | 2/1998 | Diekhans et al. | 56/10.2 F |
| 5,715,666 | 2/1998 | Huster et al. | 56/10.2 F |
| 5,828,971 | 10/1998 | Diekhans et al. | 701/41 |

FOREIGN PATENT DOCUMENTS

| | | | |
|---|---|---|---|
| 195 08 941 A1 | 9/1996 | (DE) | A01B/69/00 |
| 195 08 942 A1 | 9/1996 | (DE) | A01B/69/00 |
| 196 29 618 A1 | 1/1998 | (DE) | A01D/91/04 |
| 197 19 939 A1 | 11/1998 | (DE) | A01B/69/04 |
| 197 26 917 A1 | 1/1999 | (DE) | A01B/69/00 |
| 197 43 884 A1 | 4/1999 | (DE) | A01B/69/04 |

*Primary Examiner*—Robert E. Pezzuto
(74) *Attorney, Agent, or Firm*—Husch & Eppenberger, LLC; Robert E. Muir; Kevin M. Kercher

(57) ABSTRACT

A position-finding device for locating the position of a working edge, especially the edge of a crop, wherein the position-finding signal therefrom is supplied in the form of a steering adjustment value to an electrically controlled steering device in an agricultural machine, and wherein the device comprises a first sub position-finding device including a transmitter and a receiver whose zone of reflection extends mainly over the field that has not yet been worked, especially the not yet harvested field, and a second sub position-finding device including a further transmitter and a further receiver whose differing reflection zone is aligned such as to overlap both sides of the working edge, wherein the two reflection zones partially overlap and the two transmitters are simultaneously triggered by a pulse whereby the two receivers accordingly receive overlapping partial reception signals originating from the two transmitters and reflected by the unworked field.

16 Claims, 3 Drawing Sheets

AUTOMATIC STEERING SYSTEM USING AN ULTRASONIC POSITION-FINDING DEVICE

BACKGROUND OF THE INVENTION

The present invention relates generally to moveable machines such as agricultural machines; and more particularly to a position-finding device for locating the position of a working edge for the machine, especially the edge of a crop, wherein a position-finding signal therefrom is supplied in the form of a steering adjustment value to a steering device on the machine.

A position-finding device for controlling a steering mechanism is known from DE 195 08 941 A1. In this device, a third sub position-finding device whose transmitter and receiver are directed at the worked field serves for producing a further reference value and normalization value. This arrangement however, leads to high levels of signal distortion and hence an unwanted, non-stable steering characteristic when the reflective properties of the worked field constantly vary e.g. due to differing amounts of straw lying on the stubble or if the field boundary lies in the reflection zone. The focus and alignment of the various sub position-finding devices is such that their reflection zones are to a large extent mutually independent and there is no interaction.

Furthermore, various position-finding devices for controlling a steering mechanism are known from DE 195 08 942 A1. One of these devices uses two tightly focussed, diverging light beams. At the position of maximum divergence, one of these beams falls on the worked field and the other on the unworked field and their reflections are used, when deviations occur, to provide an on-off type of control process in correspondence with their transit times. However, this results in a steering action that wavers undesirably along the intended path. Moreover, this document also discloses an ultrasonic position-finding device for controlling a steering mechanism using a single ultrasonic transmitter and receiver combination whose reflection zone overlaps each side of the working edge. This device utilizes the differing transit times of the echoes coming from the upstanding grain and the lower lying stubble. Should the crop alternately lie flat and then upright, or, if it is low and the alignment of the stalks or crops varies, then it is not possible to discriminate between the echoes from the crops and the echoes from the stubble so that the steering action becomes uncontrollable due to the lack of a suitable reference value.

SUMMARY OF THE INVENTION

An object of the present invention is provide a device which overcomes one or more of the above described deficiencies.

Another object is to improve the device mentioned above in such a manner as to produce a more uniform pattern of steering control even when the unworked field has differing degrees of reflectivity.

In accordance with the invention there is provided a position-finding device including a first sub position-finding device including a first transmitter and a first receiver with a first reflection zone that extends mainly over a field, the field having a working edge with at least two sides, and a second sub position-finding device including a second transmitter and a second receiver with a second reflection zone, said second reflection zone being aligned such as to overlap at least two sides of the working edge.

The two transmitters are preferably triggered simultaneously by a transmitting pulse whereby the two receivers accordingly receive superimposed partial reception signals which respectively originate from the two transmitters and which have been reflected by the unworked field.

In a combine harvester, it has proved propitious for the two sub position-finding devices to be disposed such that one of them is aimed at the top surface of the grain field containing the crop and the second one is aimed so as to overlap the edge of the grain, whereby the signal from the first sub position-finding device determines the normalization value and provides the reference value. The normalized lower signal component of the second sub position-finding device that originates from the narrower, more closely located region of the upstanding crop is further processed to provide the steering positioning signal.

Advantageously, those areas of the stubble field and the grain field that are involved in the position-finding process are located sufficiently far in front of the harvesting machine that, by virtue of the compensatory effect, the normalized position-finding signal produced from the individual signal components exhibits only a slight dependence on the passage of the machine over uneven ground, especially bumpy ground, and on the inclination and tipping movements of the agricultural machine or of the cutter bars attached to the front thereof.

The position-finding device scanning the edge of the grain is advantageously aligned such that it captures an area located several meters in front of the cutter bars on the harvesting machine. The reason for this is that because the machine is steered by its rearwardly located wheels, a large distance will be covered before any departure from the intended path can be compensated.

It has proved useful in this arrangement for the signal representing the actual angle of the wheels to be introduced as a further input value into the control device so that the likely subsequent path of the harvesting machine can be conveniently taken into account, in advance, from this signal. The normalized position-finding signal and the wheel angle signal are the input signals to the control device that will form the appropriate steering adjustment value.

It has been demonstrated that approximately 60% of the operator's attention is devoted to the steering of the machine in the case of conventional combine harvesters. Steering is a particularly arduous activity due to the fact that a relatively long period of time elapses before there is a change in the lateral position of the combine harvester relative to the edge of the crop when the machine is being steered by its rear wheels, whereafter the machine has to be steered by an appropriate amount in the opposite direction in order to continue travelling in a straight line. By relieving the operator virtually completely from the steering task, this automatic steering process generally allows the machine to travel faster and also permits almost the full width of the cutter bars to be used, apart only from a margin of approximately 10 cm.

The sub position-finding devices are in the form of ultrasonic transmitter-receiver assemblies. The position-finding sensors incorporate focusing means producing a solid angle having a half-width intensity of approximately 7° and a 90% capture angle of approximately 14°. It has been found advantageous to dispose the sensors in the sub position-finding devices near the side edge of the cutter bar at a height of approximately 1.5 to 2.5 meters above the grain stock. The sensor in the first sub position-finding device is aligned at an angle to the grain and its sensing field extends approximately up to the edge of the crop. The solid angle has a capture area of approximately 0.5 meters in diameter at the point of incidence and reflection. The two reflection zones covered by the sub position-finding devices are relatively aligned such that they approximately semi-overlap. This result is achieved, in the case where the lateral divergence of the axes of the closely spaced transmitter and receiver is approximately 5°, when the sub position-finding devices are disposed directly adjacent to one another.

It has been found advantageous to pulse the ultrasonic transmitters simultaneously so that the overlapping echo signals of these two transmitters, from the overlapping areas of the reflection zones directly adjoining the edge of the grain, are incident quasi simultaneously on the receivers, thereby increasing the power of the received signal even when the power of the transmitted pulse is only moderate.

One component of the reflection signals is derived from an area of the worked field, in particular, the stubble in the field. However, such signal components are usually incident on the receiver at a later time and can thus be masked out from further processing. Temporal discrimination of the echoes from the grain and the stubble is inadequate however when the grain is lying very flat. On the other hand, it is helpful that the more densely lying grain will produce a substantially stronger echo than the more loosely packed stubble.

The position-finding device directed at the grain receives the echo from its own transmitter in full, and receives about half of the echo signal from the adjacent transmitter. The receiver having its reflection zone at the edge of the grain receives the echo emanating from its own transmitter from the unmown area, approximately half, and similarly, receives approximately half an echo from the adjacent transmitter. Thus, if, after normalization, the preferred value of the received signal for this combination of echoes is set at ⅔ of the signal received by the other receiver whose signal is taken as being the 100% normal value, then the deviations from this reference value can be used directly as adjusting signals for the steering process or can be supplied to a more complex control means for further processing.

A very useful signaling device is used in the process for adjusting the inclination of the position-finding device comprising the two sub position-finding devices. These devices are preferably accommodated in a housing with their axes diverging by a predetermined amount. When the position-finding device is located at its intended height at a predetermined distance above the edge of the grain, then, for correct alignment, it is necessary first of all that the earlier echo component originating from the upstanding grain and the later echo component originating from the stubble field appear in predefined, time-displaced windows, and the second requirement is that the two earlier echo signals being correlated must lie within a predefined tolerance range about a predefined magnitude ratio e.g. between ½ and ⅔ to 1. A test as to whether these two said criteria are being adhered to is effected on a one-off or continuous basis and the result is indicated.

It has proved propitious for the position-finding device to be adjustable between heights of 1.5 and 2.5 meters, whereby, in the simplest case, the height is altered step-wise by manually operating a telescopic strut, or, for greater convenience, the adjustment is made by a motor that is controllable from the operator's control panel.

The basic inclination setting of the position-finding device can easily be effected manually using a clamp-type terminal connection. The axes of the transmitter and the receiver preferably meet the ground, or the upper surface of the stubble when this is long, at a distance of 4 to 6 meters.

It is advantageous if provision is made for coupling the height adjustment means for the position-finding device to an inclination setting means, this arrangement being controlled by means of a motor as previously mentioned. A separate motorized inclination setting means can thereby be dispensed with when a combined adjustment means of this type is utilized.

The supporting bar assembly for the position-finding device is disposed sufficiently laterally of the reel and projects forwardly thereof to such an extent that interference echoes from the cutting and intake zones do not arise.

The supporting bar assembly for the position-finding device is preferably in the form of a four-bar linkage. This moves in line with the inclination of the position-finding device when this is raised or lowered so that at greater heights, such as are selected when the stock is higher, the inclination of the position-finding beam becomes steeper, whereby the near echo coming from the stock and the far echo coming from the stubble are spaced in time in a manner similar to that where a lower setting is used when the stock is at a lower level.

These, and other objects and advantages of the present invention, will become apparent as the same becomes better understood from the following detailed description when taken in conjunction with the accompanying drawings.

BRIEF DESCRIPTION OF THE DRAWINGS

Reference is now made more particularly to the drawings which illustrate the best presently known mode of carrying out the invention and wherein similar reference characters indicate the same parts throughout the views.

DETAILED DESCRIPTION

Figure 1:
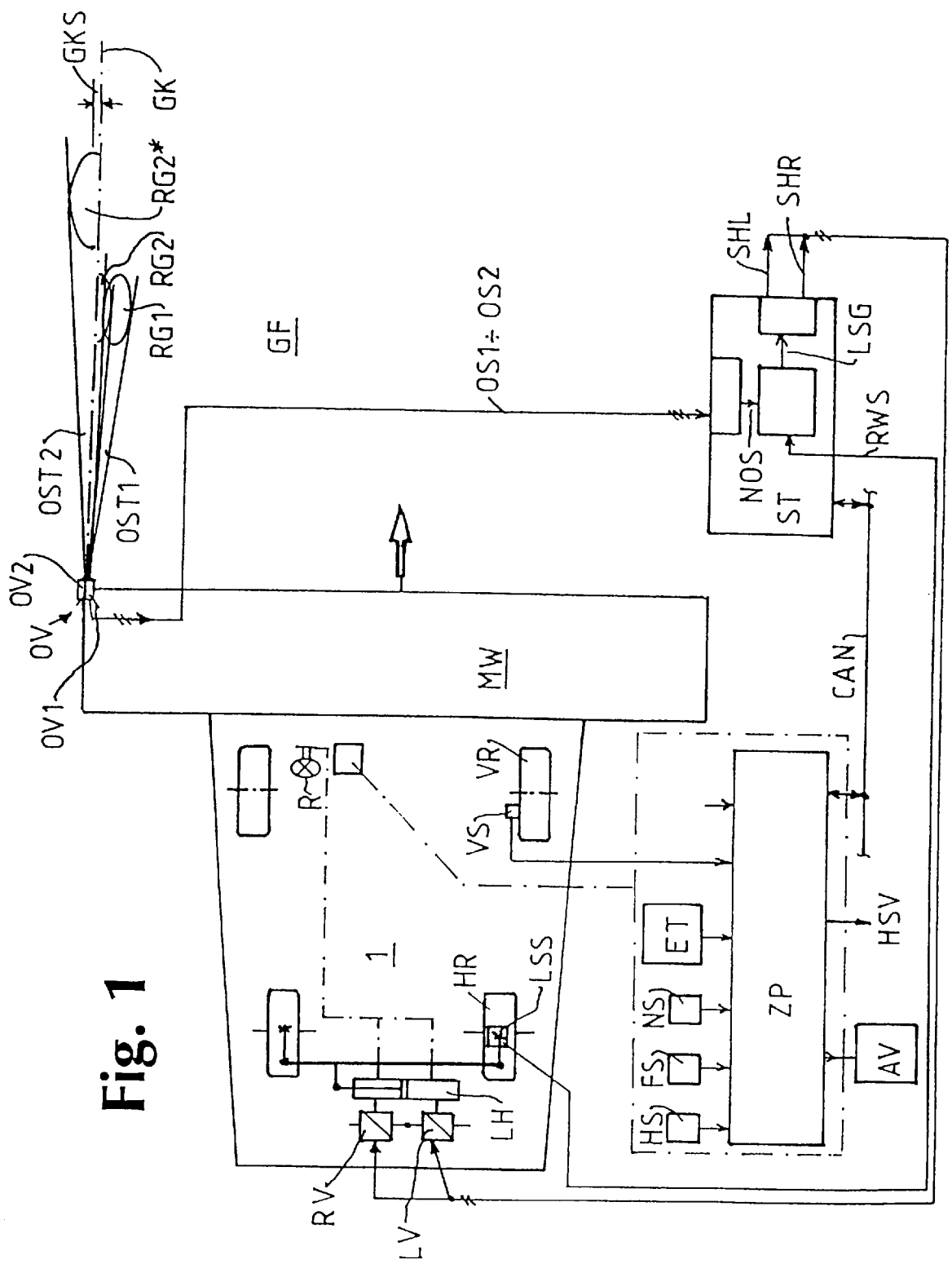
FIG. 1 is a schematic view showing an agricultural machine incorporating a steering control device embodying the invention.

FIG. 1 shows a moveable machine in the form of a self-propelled combine harvester 1 incorporating, at its front, a cutter bar or cutter bar MW which is intended to travel along an edge GK of standing grain in a grain field GF. Preferably the machine 1 is automatically controlled to stay close to the grain edge by allowing it to deviate only slightly from a predefined position GKS located laterally thereof. A height adjustable position-finding device OV includes two sub position-finding devices OV1, OV2 and is arranged above one end of the cutter bar MW and advantageously at the front corner of that end. The sub position-finding devices OV1, OV2 are advantageously in the form of ultrasonic transmitter-receiver assemblies. The sub position-finding devices OV1 and OV2 emit ultrasonic position-finding beams OST1 and OST2, respectively. Beam OST1 is directed at the grain field GF, while beam OST2 is generally directed toward the edge GK of the grain so as to be oriented on both the stubble field and the grain field GF so as to provide differing, partially overlapping reflection zones RG1, RG2, RG2*. The beams OST1 and OST2 provide reflected signals OS1 and OS2, respectively. Signal OS1 is derived from the grain field GF and is utilized for defining the normalized range thereby providing a reference value; whereas the signal OS2 from the stubble field and the grain field at the edge GK provides a steering signal after processing. The received position-finding signals OS1, OS2 are supplied to a control device ST. Ideally, these position-finding signals are digitized and converted into a normalized position-finding signal NOS. Further, the first position-finding signal OS1 is specified as a reference value for a component of the second position-finding signal OS2 which is derived from the second partial reflection zone RG2 located in the near region in the grain field GF.

In the illustrated embodiment, the control device ST is connected via a normalized data bus CAN to a central processor ZP which also monitors other control processes of the machine 1. The central processor ZP is provided with an input keyboard ET and an output device AV for this purpose. Further, the central processor ZP advantageously receives a speed indicating signal VS from front wheels VR. A hydraulic steering mechanism LH is electromagnetically controlled from the control device ST by means of a left-hand control valve LV and a right-hand control valve RV whose hydraulic outputs are connected to the existing hydraulic steering mechanism LH for turning rear wheels HR. A signal RWS representing the angular turn-out position of the steering wheels HR is derived from the steering device and supplied to the control device ST. The steering valves LV, RV are conveniently spring-loaded to provide a measure of self-protection in that they close in the event of a power failure. Should this happen, steering is effected directly by the steering wheel R via a known hydraulic control system. Moreover, a manual switch HS, a foot switch FS and a security switch NS are provided in the operator's cab. The signals from these switches are supplied to the assembly of steering valves and they are also made available to the control device ST so as to activate it when these signals are complete.

The distance from the position-finding device OV to the forward point at which the position-finding beam OST2 scans the edge of the grain GK advantageously corresponds approximately to the spacing between the front wheels VR and the rear wheels HR. Via this relationship, an angular change between the axis of the combine harvester 1 and the elongate edge of the grain GKS can be determined and this angle is represented in the position-finding signal in the form of a partial component, an equivalent to the signal indicating the angular position of the wheels. This angular component of the position-finding signal overlies the component for the lateral deviation of the directional axis of the combine harvester from the predefined, preferred path i.e. the component which furnishes its lateral position from the grain edge GKS.

The position-finding device OV preferably supplies its normalized position-finding signal NOS to the control device ST. Other sensors producing other input values are distributed around the combine harvester 1 and pass their signals to the control device ST, for example via appertaining digitizing and calculating means. Their appertaining normalizing means could of course also be installed directly in the vicinity of these sensors.

A steering wheel position sensor LSS, whose wheel angle representing signal RWS is used in appropriate manner as yet another input signal for the steering control means, is provided on the steered rear wheels HR. It has proved propitious to logically combine, in compensatory manner, the normalized position-finding signal NOS and the wheel angle representing signal RWS taken with reference to the normalizing signal, and to supply the result to a tolerance comparator which produces appropriate steering adjustment values LSG. The steering adjustment value LSG is converted into a left- or right-hand hydraulic setting signal SHL, SHR and supplied to the left- or right-hand control valve LV, RV.

Figure 2:
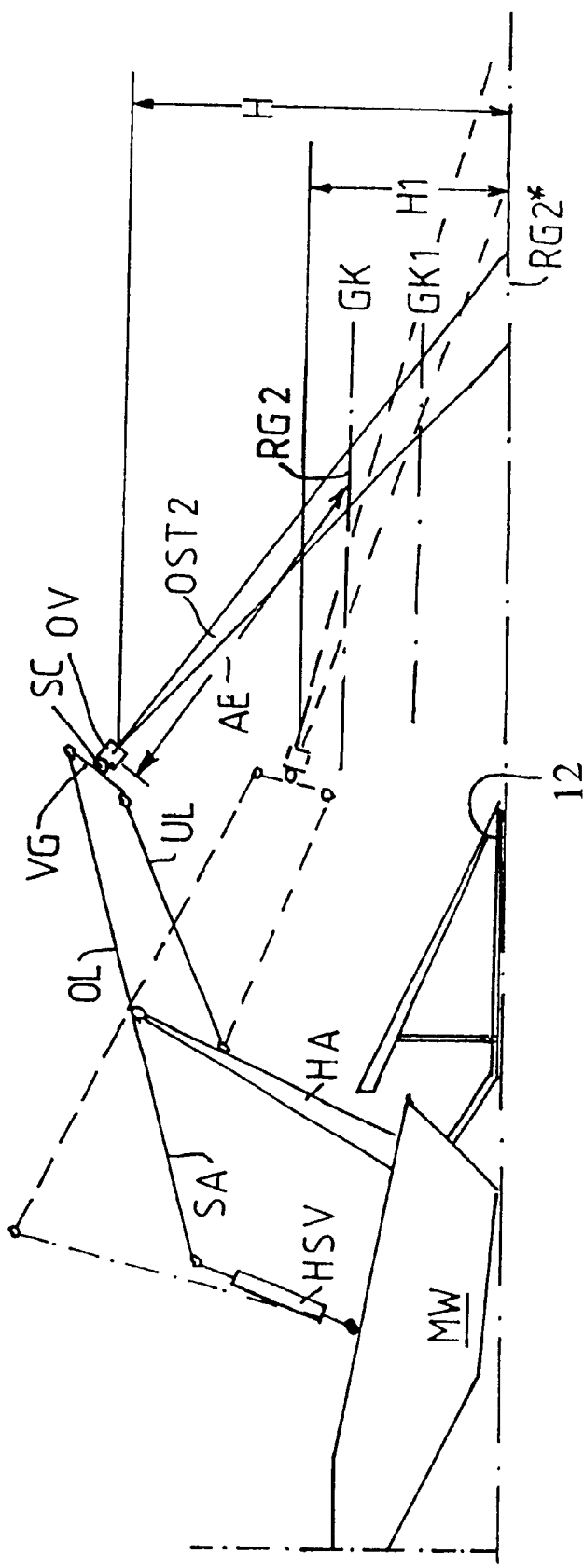
FIG. 2 is a schematic side view of the FIG. 1. arrangement.

FIG. 2 shows a side view of the cutter bar MW of the combine harvester 1 in the vicinity of the grain edge GK and also shows the position-finding beam OST2. The appertaining sub position-finding device OV2 together with the other sub position-finding device OV1 are arranged on a support HA, at the front, above a crop lifter 12 of the cutter bar MW and are adjustable in height H, H1 between 1.5 and 2.5 meters above the ground. The inclined position-finding beam OST2 is incident partially on the ground and the stubble and partially on the standing crop adjacent the grain edge GK. The included angle of the position-finding beam OST2 will provide about 50% of the signal component when the angle is approximately 7° about 90% of the signal component when the angle is approximately 14°.

The angle of inclination is selected such that the reflection zone RG2 on the standing grain GF produces a separable earlier echo than that produced by the ground or stubble reflection zone RG2*. It should be ensured that there is a fully detectable echo from both reflection zones RG2, RG2* even when travelling over uneven ground, such as a knoll, so that the ultrasonic beam does not simply disappear.

The position-finding head is lowered in height H1 when the upper edge of the grain is lower, as shown at GK1 in FIG. 2. Its inclination will then be somewhat flatter so that the two appertaining reflection zones will produce approximately the same echo transit times and the echo signals will have approximately the same amplitude. Since both of the sub position-finding devices OV1, OV2 are adjusted in height and appertaining inclination in the same manner, the temporal and magnitude relationships of the received signals will always be virtually the same.

Also, since the echo zones of the two sub position-finding devices OV1, OV2 partially overlap and are otherwise directly adjacent, their reflection characteristics will, to a large extent, be the same independently of whether a strong reflection occurs from a whole crop aligned with the ultrasonic beam, or whether a weak reflection occurs from a few stalks inclined away from the sensor. For this reason, the echo signal for the first sub position-finding device OV1 originating mainly from the grain field GF serves as the 100% normalized signal for the earlier signal component in the second sub position-finding device OV2 which likewise originates from the grain field.

Where the predefined alignment of the position-finding device relative to the grain edge GK is being maintained i.e. when the steering is correct, then the earlier echo expected from the ultrasonic beam directed at the edge will have a magnitude that is approximately ½ to ⅔ that of the reference echo from the other receiver. The echo signals are integrated during an appropriate time window in order to compensate for signal fluctuations occurring due to the heterogeneous structure of the echo zone and to make them more readily comparable. Preferably, upper and lower limiting values for the relative amplitudes of the integrated earlier echo signals are specified, whereby any under- or over-shooting of these limits will then be used for producing the steering adjustment signals. In the simplest version of the steering system, these under- or over-shooting signals are used directly as right- or left-hand setting signals for the electromagnetically actuated valves LV, RV in the hydraulic lines leading to the hydraulic steering mechanism LH.

In a more precisely operative, two-stage control device, it is preferred that the deviation of the normalized echo signal from a specified fraction of the reference signal be supplied in the form of a preferred signal to a subsequent control stage to which the actual wheel angle signal is also supplied. If the resultant difference signal under- or overshoots a lower or upper threshold value then the relevant over-shooting signal is used for differentially controlling the hydraulic steering mechanism LH or other hydraulic adjustment device. In known manner, the hydraulic adjustment device is preferably provided with a further subregulating device having a proportional characteristic.

If the control device ST is in the form of a digital computer, this will allow the steering system to be fully integrated into the usual digital control system of the combine harvester 1. The relevant parameters, especially the threshold values, are preset in the computer by a simple parameterization process by means of signals sent from the control console of the harvesting machine 1. The basic structure of the control device itself is completely neutral.

The height adjusting device for lifting the position-finding device OV up to a maximum height H and for lowering it to a lower height H1 is illustrated in FIG. 2. A swivel arm SA is mounted on the fixed supporting arm HA and is also connected to a height adjusting device HSV. The height adjusting device HSV may be a length adjusting device or an angle adjusting device which is located on the end of the supporting arm HA. One leg of the swivel arm forms part of a four-bar linkage. The position-finding device OV is mounted on a member VG at the front of the linkage. The four-bar linkage is designed such that the downward inclination of the axis of the position-finding device OV on the member VG will become steeper as the device is set higher. This can be done for example by making a lower control arm UL of the four-bar linkage shorter than an upper control arm OL thereof. In the dashed-line lower position illustrated in FIG. 2, a clamp SC holding the position-finding device OV is aligned with the lower grain edge GK1.

The adjustment ratios for the height and the inclination of the position-finding device are selected such that the first echo from the upper reflection zone RG2 arrives in approximately the same time period independently of the setting, and the ground level reflection zone RG2* is always spaced from the position-finding head OV by at least a distance AE which is markedly greater than the greatest spacing of the higher reflection zone RG2 so that the ground echo can be masked out over time.

Figure 4:
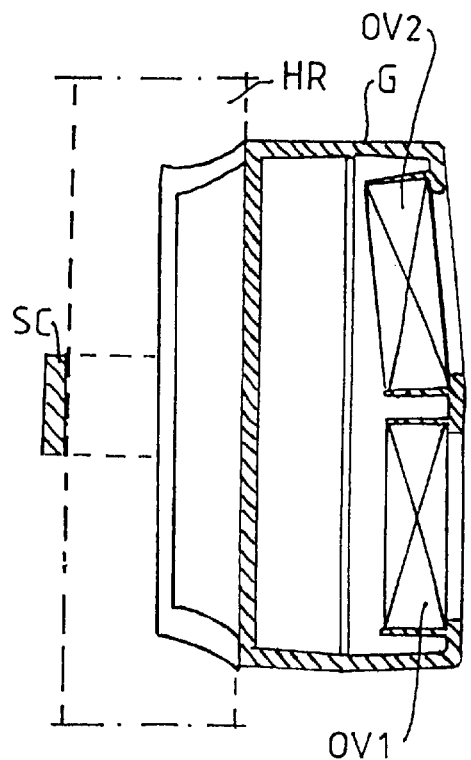
FIG. 4 is a cross-section through a position-finding device.

FIG. 4 shows a section through the position-finding device OV which is detachably mounted in tiltable manner by means of the clamp SC on a horizontal supporting tube HR. The two sub position-finding devices OV1, OV2 are housed in a housing G and diverge slightly from one another.

Figure 3:
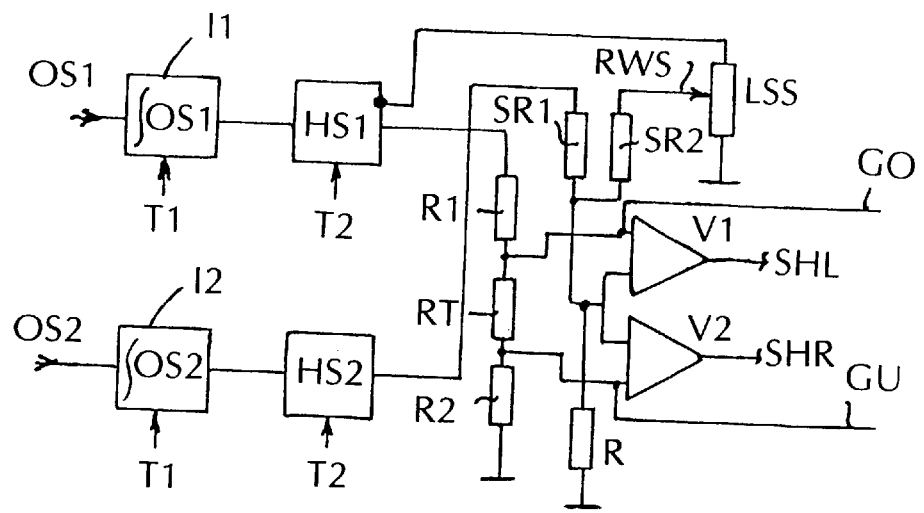
FIG. 3 is a circuit diagram of the steering control device.

A variant of the control circuit is illustrated in FIG. 3. The two position-finding signals OS1, OS2 are integrated in the integrator circuits I1, I2 during a time window T1 in which the earlier echo signal is expected. The integrated values are then accepted by the buffer circuits HS1, HS2 at a clock rate T2. The reference signal coming from the first buffer circuit HS1 is divided in a three stage voltage divider R1, RT, R2. A relative upper limiting value GO and a relative lower limiting value GU are provided at the central resistor RT, which defines the tolerance range, and these values are respectively supplied to the positive and negative inputs of two comparators V1, V2. The respective signals from the two buffer circuits HS1, HS2 are supplied to the other inputs of the comparators V1, V2.

This input circuit is in the form of an adding circuit including a resistance network R, SR1, SR2. The wheel angle signal RWS, which is supplied to a steering position sensor LSS that is fed with the negated reference signal from the first buffer circuit HS1 in the form of a reference signal, is taken from the second input SR2. Consequently, the position-finding signal OS2 will be reduced by the wheel angle signal RWS in the comparators V1, V2. Said wheel angle signal RWS is normalized with respect to the first position-finding signal OS1 and compared with the respective threshold values GO, GU. Should this sum signal exceed the upper limiting value GO which indicates that the alignment into the stock is too great, then the steering control signal SHL is supplied by the first comparator V1 to the first control valve LV. If the lower threshold GU is undershot i.e. the position-finding device is aligned too much towards the stubble field, then the other comparator V2 sends the other steering control signal SHR to the other control valve RV. The wheel setting angle is thereby controlled in proportion to the amount of deviation found by the position-finding process.

While a preferred embodiment of the invention has herein been illustrated and described, this has been done by way of illustration and not limitation, and the invention should not be limited except as required by the scope of the appended claims.

We claim:

1. In a self-propelled machine having a first pair of steerable wheels, a position-finding device including a first sub position-finding device having means for transmitting a beam to and receiving a signal from a first reflection zone that extends mainly over an unworked area which has a working edge, a second sub position-finding device having means for transmitting a second beam to and receiving a signal from a second reflection zone which overlaps the working edge, and means for processing the received signals to produce a steering adjustment value for the steerable wheels.

2. A self-propelled machine having a position-finding device in accordance with claim 1, wherein the first and second sub position-finding devices are disposed in close proximity diverging horizontally by approximately 5°, and have a 50% reception intensity range with an aperture of approximately 7°.

3. A self-propelled machine having a position-finding device in accordance with claim 1, the machine having front and rear ends, a working device mounted at the front of the machine; and means for mounting the position-finding device in a height-adjustable manner at the front of the working device.

4. A self-propelled machine having a position-finding device in accordance with claim 3, wherein the mounting means includes a supporting arm, a swivel arm, and a motorized height adjusting device disposed on the swivel arm.

5. A self-propelled machine having a position-finding device in accordance with claim 3, wherein the mounting means includes members connected in a four-bar linkage, and the linkage members having lengths which differ in such a manner that the downward inclination of the position-finding device becomes steeper as the height thereof increases.

6. A self-propelled machine having a position-finding device in accordance with claim 5, wherein the first sub position-finding device includes a first transmitter and a first receiver, the second sub position-finding device includes a second transmitter and a second receiver, and the position-finding device is always approximately inclined during the height adjustment process such that an axes of both the first and second transmitters and axes of both the first and second receivers intersect the crop at approximately the same distance and wherein an echo from at least one of the first transmitter and the second transmitter reaches the corresponding receiver spaced substantially in time from a later echo from a low-lying reflection zone.

7. A self-propelled machine having a position-finding device in accordance with claim 1, wherein the machine has a second set of wheels spaced from the first set along a path of travel, and the positioning device is configured so that its beams intersect an area in front of the machine a distance about the same as the spacing of the sets of wheels and far enough to enable steering compensation for any departure from the intended path within an appropriate distance of travel for the machine.

8. A self-propelled machine having a position-finding device in accordance with claim 1, including a housing for the sub position-findings, a supporting tube, and means for detachably mounting the housing in tiltable manner on the supporting tube so that the supporting tube extends transversely of axes of a first transmitter, a second transmitter, a first receiver and a second receiver.

9. A self-propelled machine having a position-finding device in accordance with claim 1, wherein the first sub position-finding device includes a first transmitter and a first receiver, the second sub position-finding device includes a second transmitter and a second receiver, and wherein the first transmitter and the second transmitter are triggered simultaneously by a transmitting pulse and the first and second receivers accordingly receive a plurality of superimposed first partial reception signals and second partial reception signals which originate from the first transmitter and the second transmitter and which have been reflected.

10. A self-propelled machine having a position-finding device in accordance with claim 1, wherein said device is aligned and disposed at a height laterally of the working edge such that the first reflection zone of the first sub position-finding device ends approximately at the working edge.

11. A self-propelled machine having a position-finding device in accordance with claim 1, wherein the first reflection zone and the second reflection zone overlap by up to approximately 50%.

12. A self-propelled machine having a position-finding device in accordance with claim 9, wherein each first partial reception signal and each second partial reception signal are integrated in an appertaining time window to create a first integrated partial reception signal and a second integrated partial reception signal, and means for storing said first integrated partial reception signal and said second integrated partial reception signal for further processing.

13. A self-propelled machine having a position-finding device in accordance with claim 12, wherein the means for processing the received signals includes a first comparator for checking the second integrated partial reception signal as to whether it falls below a lower limit, and a second comparator as to whether it exceeds an upper limit relative to the first integrated partial reception signal, and the means for processing the received signals produces corresponding steering adjustment values when either the upper limit or the lower limit is exceeded.

14. A self-propelled machine having a position-finding device in accordance with claim 13 including from a steering position sensor associated with one of the steerable wheels for producing a wheel angle signal which is supplied to the first comparator and the second comparator, said signal being added in a compensating direction relative to the first integrated partial reception signal.

15. A self-propelled machine having a position-finding device in accordance with claim 13, including a steering position sensor associated with each of the steerable wheels for producing wheel angle signals which indicate that the upper limit has been exceeded or the lower limit undershot, and an electromagnetically controlled hydraulic valve for receiving the signals and controlling steering of the machine.

16. A position-finding device for locating the position of a working edge of a crop in a field, wherein the position-finding signal therefrom is supplied in the form of a steering adjustment value to an electrically controlled steering device in an agricultural machine; the position-finding device including a first sub position-finding device including a transmitter and a receiver whose zone of reflection extends mainly over an unharvested portion of the field, and a second sub position-finding device including a further transmitter and a further receiver whose differing reflection zone is aligned such as to overlap the working edge, means for logically combining a normalized signal received by the second sub position-finding device with a reference-like signal received by the first sub position-finding device and producing said steering adjustment value, and wherein the two reflection zones respectively associated with the two sub position-finding devices partially overlap.

* * * * *